United States Patent

[11] 3,603,676

| [72] | Inventor | Richard Loewe<br>Stuttgart, Germany |
| --- | --- | --- |
| [21] | Appl. No. | 2,790 |
| [22] | Filed | Jan. 14, 1970 |
| [45] | Patented | Sept. 7, 1971 |
| [73] | Assignee | Robert Bosch Photokino GmbH<br>Stuttgart-Unterluerkheim, Germany |
| [32] | Priority | Jan. 18, 1969 |
| [33] | | Germany |
| [31] | | P 19 02 427.2 |

[54] MEANS FOR PRODUCING FADE-IN AND FADEOUT EFFECTS ON MOTION PICTURE FILM
11 Claims, 3 Drawing Figs.

[52] U.S. Cl. ........................................... 352/91
[51] Int. Cl. ......................................... G03b 21/36
[50] Field of Search ............................. 352/91, 217, 209, 216

[56] References Cited
UNITED STATES PATENTS
3,246,944  4/1966  Winkler..................... 352/91

*Primary Examiner*—Donald O. Woodiel
*Attorney*—Michael S. Striker

ABSTRACT: A motion picture camera with a between-the-lens diaphragm wherein the means for producing fade-in and fadeout effects comprises a diaphanous light-dispersing optical element which is movable across the path of incoming scene light between the diaphragm and one lens of the picture-taking objective so that the optical element thereby varies the sharpness of the real image which is produced by the objective. The optical element is movable by a rotary cam against the opposition of a spring and its initial position with reference to the aperture of the diaphragm is adjustable by a selector which can pivot a lever positioned to displace the optical element in response to rotation of the cam or in response to displacement of the selector. A carrier which supports the optical element and is movable by the lever is provided with a mask which can be moved across the path of incoming scene light instead of the optical element to thereby effect the brightness of the real image.

PATENTED SEP 7 1971 3,603,676

INVENTOR
Richard LOEWE
BY
[signature]
his ATTORNEY

MEANS FOR PRODUCING FADE-IN AND FADEOUT EFFECTS ON MOTION PICTURE FILM

BACKGROUND OF THE INVENTION

The present invention relates to motion picture cameras in general, and more particularly to improvements in means for producing fade-in and fadeout effects on motion picture film. Still more particularly, the invention relates to improvements in motion picture cameras wherein the fade-in and fadeout effects are produced in response to displacement of an optical element.

German Pat. N. 903,650 discloses a motion picture camera wherein a light dispersing optical element in the form of a plain or reticulated wedge is moveable in front of the picture-taking objective. The light transmissivity or reticulation of the wedge varies gradually from one end to the other end. Gradual introduction of the wedge into the path of incoming scene light causes progressive dimming of the image which is produced by the objective, i.e., the sharpness of the image decreases without appreciable reduction in overall brightness. If the wedge is thereupon gradually withdrawn from the path of incoming scene light, the sharpness of the image increases and ultimately equals the original sharpness, namely, such sharpness as is determined by the setting of the objective lens.

A drawback of the just-described motion picture camera is that the boundary between the dimmed and sharper portions of the image is clearly visible during introduction of the wedge into as well as during its withdrawal from the path of incoming scene light. This is due to the fact that the wedge is located in front of the picture taking objective. Consequently, the images which are produced while the wedge extends into but does not intercept the entire beam of incoming scene light exhibit readily detectable portions of different sharpness. During fadeout, the ratio of the sharp portion to the blurred portion of the image decreases gradually to zero and such ratio increases during fade-in until the sharpness reaches its maximum value. The entire area of the image exhibits a uniform sharpness only when the entire beam of incoming light is intercepted by the wedge or when the wedge is completely withdrawn from such path.

Another drawback of the patented camera is that the length of the wedge (as considered in the direction in which the wedge is moved at right angles to the optical axis of the objective) is a multiple of the maximum effective diameter of the objective. This is due to the fact that, in order to obtain images of different sharpness (or unsharpnesses), the light transmissivity of the wedge must vary gradually from one end to the other, and the length of the wedge must be such that it can be shifted relative to the optical axis at the time when it already intercepts the entire beam of incoming scene light. Otherwise stated, even when the wedge produces a minimum degree of unsharpness, it must extend across the entire light beam which is admitted into the camera while the diaphragm defines an aperture of maximum size. Moreover, the dimming effect of such wedge is not entirely satisfactory because different portions of the wedge exhibit different light refracting and dispersing characteristics which affect the uniformity of dimming during fade-in or fadeout. Due to its size, the wedge cannot be readily installed in or on all types of motion picture cameras.

SUMMARY OF THE INVENTION

An object of the invention is to provide a motion picture camera which includes means for producing fade-in and fadeout effects and wherein such means is capable of varying the sharpness of the entire image which is produced by the picture-taking objective.

Another object of the invention is to provide means for producing fade-in and fadeout effects either by changing the sharpness or by changing the brightness of the real image.

A further object of the invention is to provide a motion picture camera with simple, compact and inexpensive means for producing fade-in and fadeout effects.

The invention is embodied in a motion picture camera which comprises a picture taking objective, a between-the-lens diaphragm which can define a range of aperture sizes, a diaphanous (light-transmitting) light-dispersing optical element which is adjacent to the diaphragm and is preferably located between the diaphragm and one lens of the objective, and displacing means for moving the optical element across the path of incoming scene light whereby the optical element varies the sharpness of the image which is produced by the objective.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
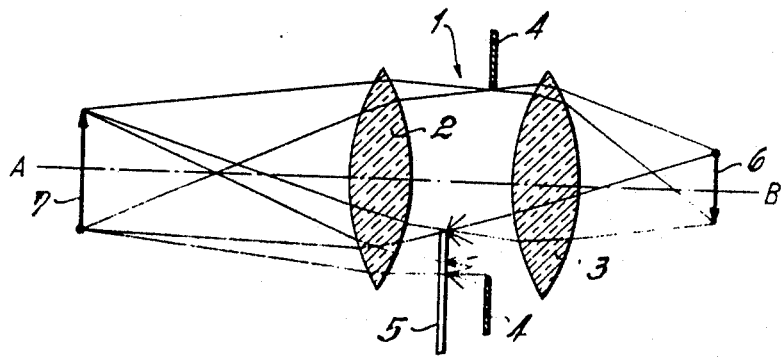
FIG. 1 is a schematic side elevational view of a picture-taking objective in a motion picture camera, further showing a between-the-lens diaphragm and an optical element which is arranged to change the sharpness of the real image in response to its movement across the path of incoming scene light.

Referring first to FIG. 1, there is shown the picture-taking objective 1 of a motion picture camera. The objective comprises two lenses 2, 3. An adjustable diaphragm 4 is installed in the objective mount (not shown) between the lenses 2, 3; this diaphragm can define apertures of varying size. The exact construction of the diaphragm 4 forms no part of the present invention.

The means for producing fade-in and fadeout effects comprises an optical element 5 which is installed in front of the diaphragm 4, namely, between the diaphragm and the front lens 2, and is movable substantially at right angles to the optical axis A-B to intercept a greater or smaller portion of incoming scene light. The subject to be photographed is indicated at 7 and its real image at 6. Fadeout involves progressive darkening or blurring of the image until the action or image disappears, and fade-in involves gradual brightening from black or sharpening to a full scene or picture. If the fade-in effect is superimposed on the fadeout effect, the preceding scene becomes progressively dimmer while the sharpness of the image of the next-following scene increases.

The optical element 5 is a diaphanous light-dispersing plate or disk, e.g., a rectangular plate (FIG. 2) of frosted or opal glass. During introduction into the path of incoming scene light (upwardly, as viewed in FIG. 1 or 2), the optical element 5 produces a fadeout effect because it disperses a gradually increasing percentage of scene light and thereby effects a proportional decrease in sharpness of the image 6. The image disappears completely when the element 5 extends across the entire beam of incoming scene light, namely, across the entire beam which can pass through the aperture defined by the diaphragm 4. A fade-in effect is produced when the optical element 5 is gradually withdrawn from the path of scene light; the element 5 then admits a progressively increasing amount of undiffused light into the aperture of the diaphragm 4 so that the sharpness of the image 6 increases proportionally. Since the element 5 is placed close to the diaphragm 4, or is close to the diaphragm at least at the time when it extends into the path of incoming light, the reduction in sharpness which is due to dispersion of incoming scene light is effective across the entire image as soon as the uppermost portion of the element 5 enters the path of such light. Thus, the element 5 does not produce a detectable boundary between sharper and dimmer portions of the image. In the position shown in FIG. 1, the upper portion of the element 5 overlaps about one-fourth of the diaphragm aperture. The complete image of the subject 7 which is produced by the lenses 2, 3 in the thus overlapped portion is of maximum dimness whereas the light rays which can bypass the element 5 are free to produce a sharp image of the subject. The image 6 already exhibits a pronounced lack of sharpness, i.e., the outlines of the subject are blurred.

Figure 2:
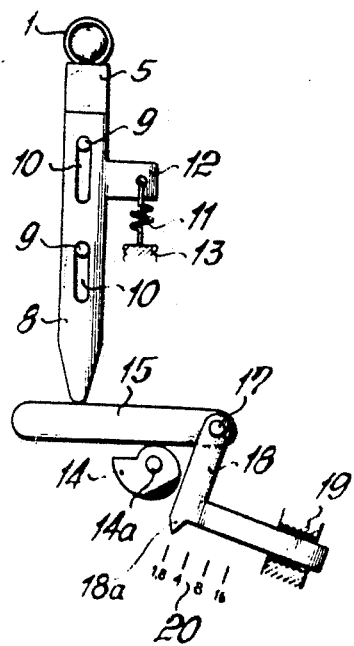
FIG. 2 is a smaller scale front elevational view of the structure shown in FIG. 1 and of the displacing means for the optical element.

As shown in FIG. 2, the optical element 5 is mounted on a support or carrier 8 having elongated guide slots 10 for stationary guide pins 9 which are mounted in the housing of the motion picture camera. The pins 9 and slots 10 constitute a guide means which permits movements of the optical element 5 at right angles to the optical axis A–B of the objective 1. A helical spring 11 which is attached to an arm 12 of the carrier 8 and to a stationary portion 13 of the camera housing tends to maintain the optical element 5 in that end position in which the path of incoming scene light is unobstructed. Such end position of the optical element 5 is shown in FIG. 2.

The carrier 8 forms part of a displacing mechanism for the optical element 5, and such displacing mechanism further includes an actuating assembly which can move the element 5 by way of the carrier. The actuating assembly includes the spring 11 and a rotary cam 14 which is turnable about the axis of a shaft 14a and can be moved by hand or by means of a motor, not shown. When the cam 14 is rotated from the illustrated neutral position in a counterclockwise direction, as viewed in FIG. 2, the optical element 5 moves upwardly and ultimately assumes an upper end position in which the entire beam of incoming scene light must pass therethrough prior to entering the aperture of the diaphragm 4.

It will be noted that the actuating cam 14 does not directly engage the lower end portion of the carrier 8. This is due to the provision of a presetting device which also forms part of the aforementioned displacing mechanism and enables the user of the camera to select the initial position of the optical element 5 in such a way that the latter's upper edge portion immediately enters the path of incoming scene light as soon as the cam 14 is moved from the illustrated neutral position. The presetting device includes a motion-transmitting lever 15 which engages the lower end portion of the carrier 8 and bears against the face of the actuating cam 14. The right-hand end portion of the lever 15 is connected to a selector 18 by a pivot pin 17. The selector 18 is reciprocable in a bearing 19 and has an index 18a which can be placed into registry with a selected graduation of a scale 20. The latter is calibrated to indicate various diaphragm apertures. The bearing 19 maintains the selector 18 in an inclined position so that the selector can move the pivot pin 17 at an oblique angle to the direction of reciprocatory movement of the carrier 8. Thus, a displacement of the selector 18 with reference to the bearing 19 causes the lever 15 to pivot on the face of the cam 14 and to effect a change in the initial position of the carrier 8, under or against the bias of the spring 11. When the size of the aperture defined by the diaphragm 4 is reduced, the selector 18 is caused to move its index 18a into registry with the corresponding graduation of the scale 20 whereby the carrier 8 moves upwardly so that the upper edge of the optical element 5 registers with the lowermost portion of the selected aperture. This insures that the fadeout effect begins as soon as the user decides to turn the actuating cam 14 in a counterclockwise direction.

Figure 3:
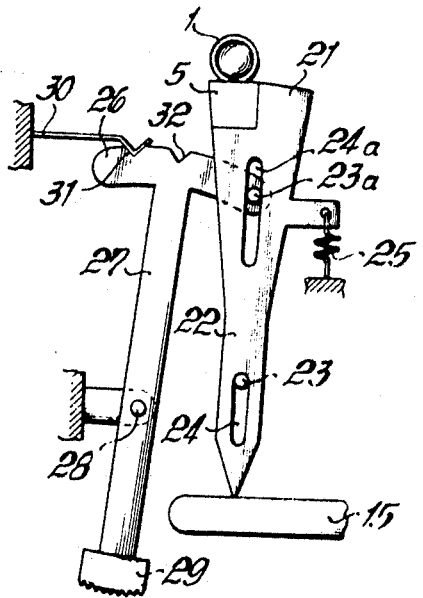
FIG. 3 is a similar front elevational view of modified displacing means for the optical element and for an opaque element which can be used as a substitute for the optical element to change the brightness of the image.

The structure of FIG. 3 comprises a modified carrier 22 for the optical element 5. A portion 21 of this carrier constitutes an opaque flag or mask which can be moved across the path of incoming scene light instead of the optical element 5 to produce a different fade-in or fadeout effect. Thus, the user of the camera has the option of achieving a smooth transition between a preceding and a next-following series of shots either by changing the sharpness of images at a substantially constant brightness (by way of the optical element 5) or by changing the brightness at a substantially constant sharpness (by way of the opaque element 21). It is clear that the mask 21 can constitute a separately produced element which is permanently or separably affixed to the carrier 22.

The carrier 22 has a pair of aligned elongated guide slots 24, 24a for two guide pins 23, 23a. The pin 23 is fixedly mounted in the housing of the motion picture camera but the pin 23a is movable along an arc whose center of curvature is located on the axis of a stationary pivot 28. To this end, the pin 23a is mounted on the segment-shaped end portion 26 of one arm of a shifter 27 which is a two-armed lever fulcrumed at 28. The lower end portion of the lower arm of the shifter lever 27 carries a knob 29 which is accessible to the user of the camera. A spring 25 biases the lower end portion of the carrier 22 against a motion-transmitting lever 15 which is mounted in the same way as the lever 15 of FIG. 2. The selector 18 and the actuating cam 14 are not shown in FIG. 3.

When the optical element 5 is to be moved away from the illustrated operative position, the user of the camera moves the knob 29 in a direction to the right, as viewed in FIG. 3, so as to place the opaque element 21 directly below the diaphragm (not shown) between the lenses of the picture taking objective 1. The actuating cam 14 is thereupon rotated to move the carrier 22 upwardly whereby the opaque element 21 moves across the path of the incoming scene light to produce a fadeout effect. The fade-in effect is produced when the opaque element 21 is moved downwardly in response to a clockwise rotation of the actuating cam. A leaf spring 30 which is anchored in the housing of the camera constitutes a simple detent structure for the shifter lever 27. The tooth at the free end of the leaf spring 30 extends into a notch 31 of the segment 26 when the fade-in and fadeout effects are to be produced by the optical element 5. The tooth extends into a second notch 32 of the segment 26 when the fade-in and fadeout effects are to be produced by the opaque element 21. The purpose of the detent spring 30 is to prevent unintentional movements of the guide pin 23a. When the user manipulates the knob 29, the carrier 22 turns about the axis of the lower guide pin 23.

An advantage of the improved motion picture camera is that the optical element 5 or the opaque element 21 is capable of immediately affecting the sharpness or brightness of the entire real image as soon as it overlaps even a small portion of the aperture which is defined by the diaphragm 4. This is believed to be due to the fact that light rays issuing from any given point of the subject 7 cross each other in the plane of the diaphragm aperture so that each, even the smallest, zone of the objective 1 furnishes a complete image of the subject. The sharpness of the image which is produced in that zone that is affected by the optical element 5 is reduced due to the light-dispersing effect of the optical element while the remainder of the objective continues to furnish a sharply defined image. Thus, a second image of reduced sharpness is superimposed upon a basic image of greater sharpness whereby the ratio between the two images decreases as the optical element 5 continues to move across the path of incoming scene light. Consequently, the extent to which the sharpness of the image is reduced is not a function of differences in the light-dispersing capacity of the optical element 5, i.e., such extent is determined solely by the degree to which the optical element projects into the path of incoming light, namely by the ratio between the dispersed and unaffected portions of the incoming light.

Another advantage of the improved camera is that the optical element 5 is very simple and compact. It can consist of a piece of frosted glass of constant density (light dispersing characteristics). The size of the optical element 5 need not exceed the maximum size of the aperture which can be defined by the diaphragm 4, i.e., the element 5 should be capable of intercepting the entire beam of light which can pass through the diaphragm 4 when the latter is fully open.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefor, such adaptations should and are intended to be comprehended within the meaning and range of equivalence of the claims.

What is claimed as new and desired to be protected by Letters Patent is set forth in the appended claims.

1. In a motion picture camera, a combination comprising a picture-taking objective having a plurality of lenses including a first and second lens; a diaphragm disposed between said first and second lenses; a diaphanous light-dispersing optical element adjacent to said diaphragm; and displacing means for moving said optical element across the path of incoming scene light whereby said optical element varies the sharpness of the image produced by said objective.

2. A combination as defined in claim 1, wherein said displacing means comprises a carrier supporting said optical element actuating means for moving said carrier substantially at right angles to the axis of said objective.

3. A combination as defined in claim 1, wherein said carrier is reciprocable and said actuating means comprises spring means for biasing said carrier in a first direction and cam means for moving said carrier in a second direction against the opposition of said spring means.

4. A combination as defined in claim 3, wherein said displacing means further comprises presetting means for moving said carrier independently of said cam means.

5. A combination as defined in claim 4, wherein said diaphragm is adjustable to define a range of apertures and wherein said presetting means is arranged to move said carrier so as to place said optical element adjacent to the path of scene light passing through the selected aperture in a neutral position of said cam means.

6. A combination as defined in claim 5, wherein said presetting means comprises a motion-transmitting member and said spring means is arranged to bias said carrier against said member, said cam means being arranged to move said member against the opposition of said spring means.

7. A combination as defined in claim 6, wherein said motion transmitting member is a lever and said presetting means further comprises selector means arranged to pivot said lever with reference to said cam means to thereby move said carrier under or against the bias of said spring means.

8. A combination as defined in claim 1, further comprising an opaque element, said displacing means comprising means for moving said opaque element across the path of incoming scene light instead of said optical element or vice versa.

9. A combination as defined in claim 8, wherein said displacing means comprises common carrier means for said elements and actuating means operative to displace said carrier means.

10. A combination as defined in claim 9, further comprising shifter means for moving said carrier means between a first and a second position in which said carrier means respectively moves said optical element and said opaque element across said path in response to operation of said actuating means.

11. A combination as defined in claim 1, wherein said optical element is movable across said path between one of said first and second lenses and said diaphragm.